Oct. 23, 1956 M. H. HUTCHINSON 2,767,967
FRACTIONATING TRAY
Filed Sept. 4, 1953 3 Sheets-Sheet 1

INVENTOR.
MARGARET H. HUTCHINSON
BY
Morgan, Finnegan, Durham & Pine
ATTORNEYS.

Oct. 23, 1956  M. H. HUTCHINSON  2,767,967
FRACTIONATING TRAY
Filed Sept. 4, 1953  3 Sheets-Sheet 2
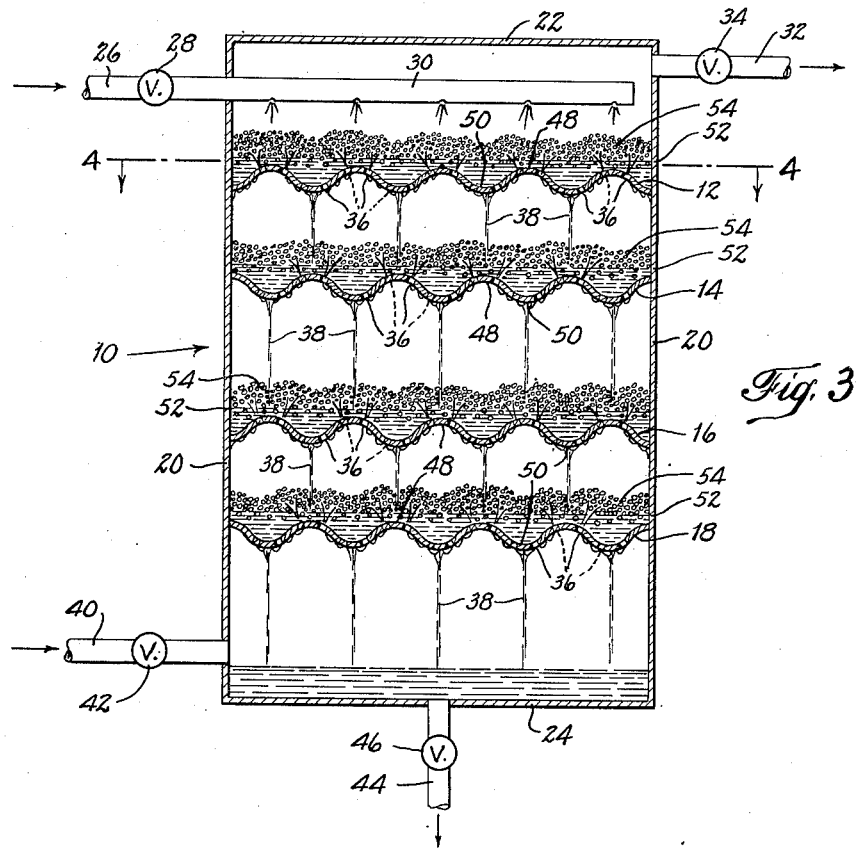
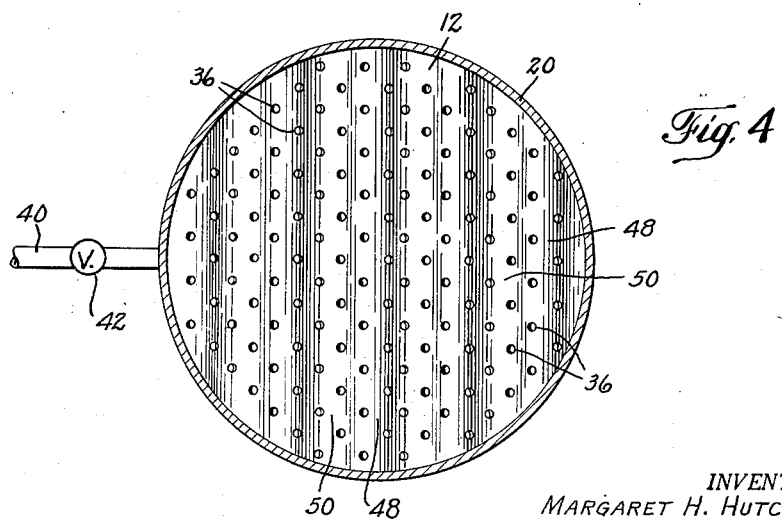
INVENTOR.
MARGARET H. HUTCHINSON
BY
Morgan, Finnegan, Durham & Pine
ATTORNEYS.

Oct. 23, 1956  M. H. HUTCHINSON  2,767,967
FRACTIONATING TRAY
Filed Sept. 4, 1953  3 Sheets-Sheet 3

INVENTOR.
MARGARET H. HUTCHINSON
BY
Morgan, Finnegan, Durham & Pine
ATTORNEYS.

United States Patent Office 2,767,967
Patented Oct. 23, 1956

2,767,967

FRACTIONATING TRAY

Margaret H. Hutchinson, Reading, Mass., assignor to Stone & Webster Engineering Corporation, Boston, Mass., a corporation of Massachusetts Application September 4, 1953, Serial No. 378,693

16 Claims. (Cl. 261—113)

This invention relates to fractionating apparatus and more specifically to perforated trays and methods for effecting the countercurrent contacting of liquid (or liquids) or fluidized solid with gas or vapor or with a lighter and immiscible liquid, as in fractionating columns, stripping columns, liquid-liquid extraction columns and other similar apparatus.

Objects and advantages of the invention will be set forth in part hereinafter and in part will be obvious herefrom, or may be learned by practice with the invention, the same being realized and attained by means of the combinations and improvements pointed out in the appended claims.

The invention consists in the novel combinations and improvements herein shown and described.

A perforated tray in accordance with this invention constitutes an improvement over flat perforated trays with separate downpipes for liquid, flat perforated trays without separate downpipes for liquid, and perforated trays without downpipes for liquid but which are so designed as to accumulate relatively clear liquid in pockets or troughs below the level for contacting the two different phases, the pockets or troughs of which are of such design as to prevent the upward flow of vapor, gas, or lighter and immiscible liquid into these.

It is an object of this invention to effect certain new and useful improvements in perforated trays for effecting countercurrent contacting of liquid (or liquids) or fluidized solid (or solids) with gas or vapor or with a lighter and immiscible liquid to the end that intimate contact of the lighter and heavier counterflowing phases may be effected with suitable tray design and fluid rates; that discontinuity of flow conditions from one opening in the tray to the next will be avoided; that a uniform bubbling action may be obtained across the entire active portion of the tray area; that almost all (about 85 to 95%) of the total tray area may be active and constitute the effective tray area, and very little required for supports, etc., as contrasted with most tray designs; that liquid gradient may be eliminated; that each tray may serve as a liquid distributor along the vertical axis; that the phases may be well separated beneath each tray in order to minimize upward flow of the heavier phase and downward flow of the lighter phase; that for a given tray area the tray may have more passages than are practical with known perforated trays, thereby permitting low pressure drop of the lighter phase and low entrainment of the heavier phase by the lighter; that extremes in flow rate requirements may be met with even a single type of perforated sheet in various adaptations; and, that a given tray may function over wide ranges of operating conditions.

In general, each tray in accordance with this invention is characterized by a freedom from down-comers, has a surface configuration providing a pattern of tray uneveness, and has a uniform or substantially uniform pattern of openings over the developed area (that is, as flattened out).

In their fabricated and installed form the trays possess each a plurality of uniformly or substantially uniformly spaced high and low areas, the uniform spacing of which is large in relation to the openings but small in relation to the overall tray area. The transition or change in surface contours between high and low areas is, preferably, smooth and gradual although moderately sharp breaks such, for example, as breaks less sharp than, say, 60°, are within the contemplation of this invention. The difference in height between the highest and lowest areas of a given tray is, preferably, small enough to permit upward flow of the lighter phase through the openings even at the lower areas and to permit downward flow of the heavier phase through the openings even at the higher areas, although the lighter phase may flow preferentially at the higher areas and the heavier phase preferentially at the lower areas, the uniformity of flow depending upon tray dimensions and rates of flow. In a normal application, the trays are superimposed and contained in a shell in suitable vertically spaced relation to each other and in circumferential substantially sealing engagement with the shell wall so that the counterflowing fluid phases may pass upwardly and downwardly only through the openings in the trays.

When a uniformly perforated flat sheet is formed as, for example, by pressing, to present a plurality of high and low points, the resulting three-dimensional surface possesses an open area that is gross area of openings, correspondingly more, when referred to a unit of projected area, than it presented in the flat form. It is, therefore, possible to provide more passages for fluids flowing countercurrently through the trays thus formed. When the transition from the high to the low points is gradual or moderate, there need be no abrupt discontinuity of flow conditions from one opening to the next, although any particular hole may discharge vapor and liquid alternately, depending upon local, rhythmic action of the liquid phase. In these facts lie the basic features of the invention: an extension of plate surface by the creation of a three-dimensional surface, the extension being formed in such a way as to produce changes in surface contours between high and low points on the tray operative, preferably, to provide only smooth and gradual changes in operation from one point to another on the upper surface, and to produce uniform frothy or mixing conditions along any horizontal plane above the higher points of the tray.

The above and other objects and advantages will become more apparent in the following description and accompanying drawings forming part of this application.

The drawings exemplify certain embodiments of the invention for the attainment of the objects and advantages thereof, and it will be apparent that numerous other modifications may be made to meet specific requirements or attain similar ends without departing from the scope and spirit thereof.

Of the drawings:

Fig. 1 is a semi-diagrammatic view taken along the vertical medial plane of a fractionating column equipped with the perforated trays of this invention and adapted to carry out the method of this invention, the trays embodying, as a preferred pattern of tray uneveness, regular waves of sinusoidal or substantially sinusoidal form, and the view showing a preferred arrangement of the several trays of the column wherein each tray is disposed so that its wave troughs lie at an angle of ninety degrees in azimuth to those of the next adjacent tray;

Fig. 3 is a view corresponding substantially to the view of Fig. 1 but showing a modified arrangement of the trays wherein each tray is disposed so that its wave troughs lie in parallel relation to those of the next adjacent tray;

Fig. 4 is a view in section taken along the line 4—4 of Fig. 3;

Figure 5:
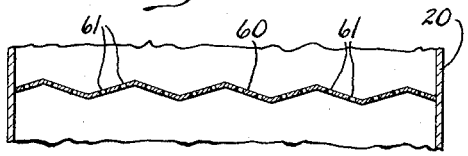
Figure 6:
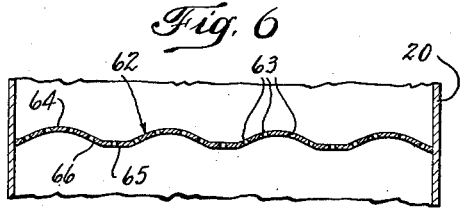
Figure 7:
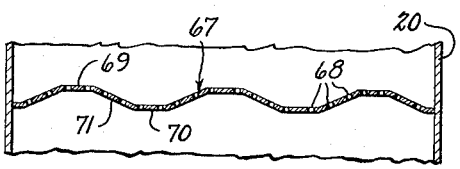
Figure 8:
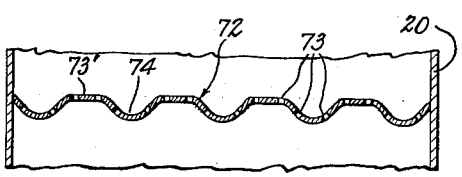

Figs. 5–8 inclusive are fragmentary views in vertical section of fractionating columns equipped with the preforated trays of this invention and adapted to carry out the method of this invention, the several views each being taken along the vertical medial plane of the respective columns and showing different patterns of tray unevenness employed in the several columns, the pattern of Fig. 5 being one of V-shaped regular waves; that of Fig. 6 being one formed by joining adjacent high curved areas and low flat areas, by curved and inclined areas; that of Fig. 7 by joining adjacent high and low flat areas, by straight and inclined areas; and, that of Fig. 8 by joining adjacent high flat areas and low curved areas, by straight and inclined areas.

Figure 9:
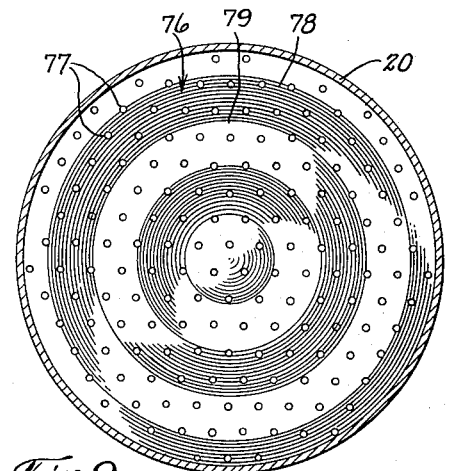
Figure 10:
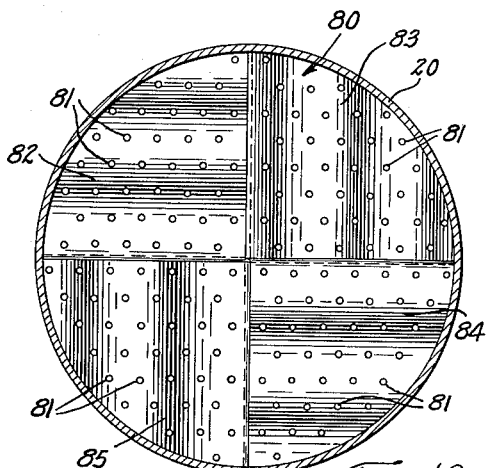
Figure 11:
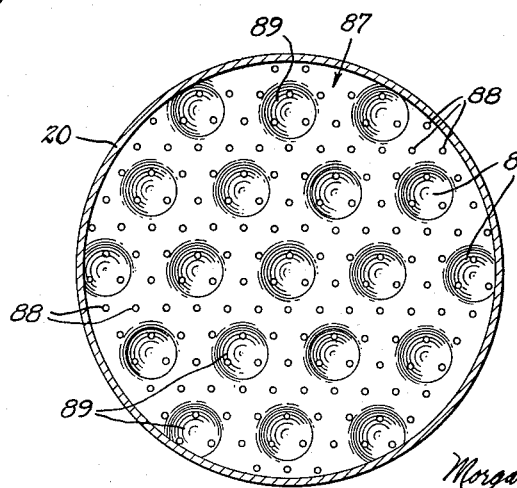

Figs. 9 to 11 inclusive are views in horizontal section of fractionating columns equipped with the perforated trays of this invention, and adapted to carry out the method of this invention, the views each being taken along a horizontal plane paralleling the tray and showing patterns of tray unevenness as viewed in plan: the pattern of Fig. 9 being one of sinusoidal and concentric waves; that of Fig. 10 being a checkerboard pattern with alternating areas of pie-shape having straight, parallel waves, the direction of which is changed by 90 degrees on successive areas; and, that of Fig. 11 being one of shallow cups uniformly effected in and over the tray area.

Referring now more particularly to Figs. 1 to 4 inclusive, 10 denotes a fractionating or rectifying column having a plurality of perforated fractionating trays 12, 14, 16 and 18, each having openings or perforations 36, the trays being disposed one above the other in suitably spaced relation. Each tray is preferably of a surface configuration to provide a pattern of tray unevenness characterized by straight, parallel, regular waves of sinusoidal or substantially sinusoidal form paralleling a tray diameter, each tray embodying alternate elevated areas 48 and depressed areas 50, as shown. Each tray is also circumferentially secured, preferably sealingly to the surrounding wall or shell 20 of the column so that liquid supported by the tray can flow downwardly only through the perforations 36 in the tray and cannot spill or drain over the edge. The shell 20 is closed at each of its ends as by a top plate 22 and a bottom plate 24.

The openings 36 may be square, triangular, rectangular, oblong, or any convenient shape, but are preferably round, as shown. These openings, of whatever form, are arranged uniformly with respect to each other over the developed area (that is, as flattened out), the round holes being arranged, preferably, on an equilateral triangular pitch as in Fig. 2 (that is, with centers of adjacent holes representing the corners of equilateral triangles). In the modification shown in Figs. 3 and 4, however, the openings 36, though round, are arranged on a square pitch (that is, with centers of adjacent holes representing the corners of squares). This arrangement though feasible, lacks certain advantages, however, of the triangular pitch.

A conduit 26 controlled by valve 28 is adapted to distribute liquid over the surface of the uppermost tray 12 as by means of one or more perforated distributor tubes 30 coupled with the conduit 26. In countercurrent contacting of a liquid (or liquids) with a lighter and immiscible liquid, this conduit provides for the admittance of liquid which may represent the heavier phase, but is ordinarily used for admitting a refluxing liquid such as would be condensed from the vapor or overhead product, which includes vaporized reflux, leaving the tower through a vapor transfer line 32 controlled by valve 34.

Figure 1:
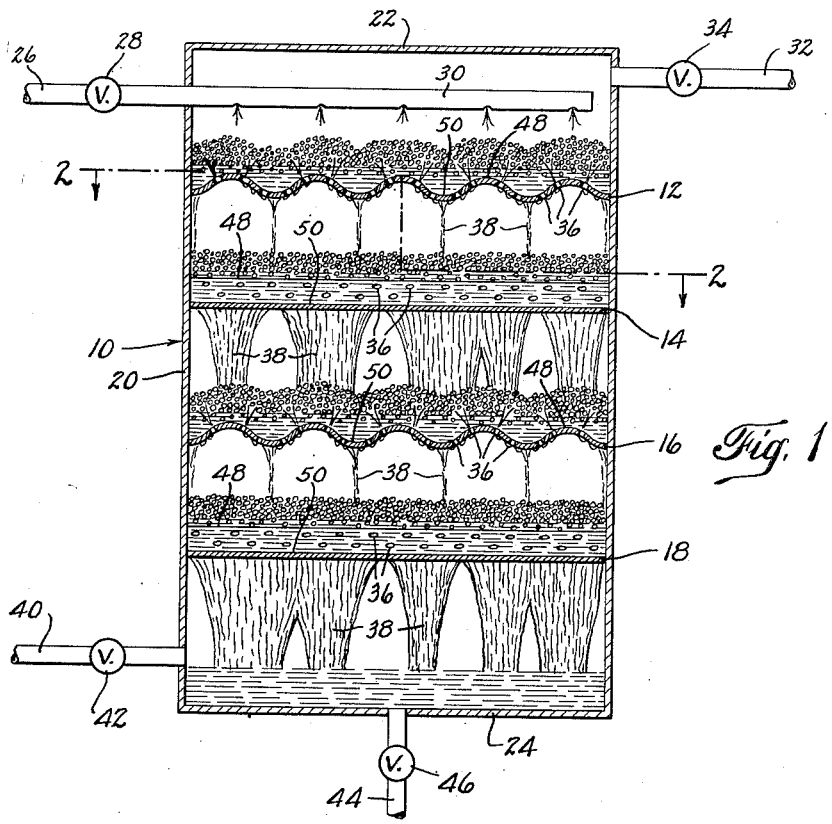

The liquid introduced into the tower 10 by means of the distributor 30, is deposited on the top plate 12 and, during the fractionating process, liquid flows downwardly from each tray to the underlying tray through the perforations 36, preferentially at the low areas 50, in each of the trays and flows from the tray at the lowest points in a more or less continuous sheet 38, as indicated in Fig. 1, for refluxing the underlying tray. It is seldom found in practice, however, that liquid discharges from all low points at any one time. Tray size and design are so adapted to the designated fluid rates that liquid introduced by the distributor 30 maintains the desired liquid level on, or refluxing of, the top tray.

Simultaneously with this downward flow of reflux liquid (heavier phase), feedstock representing the lighter phase is introduced through the conduit 40 controlled by valve 42. This feedstock may be in vapor or gas form, as supplied, or it may be supplied as a liquid to be vaporized or gasified within the tower, in which instance means may be provided for transforming the liquid to a vapor or gas upon or following entry into the tower. These means may be in the form of a reboiler (not shown), or the liquid may be introduced under pressure so that upon its release within the tower maintained under a lower pressure, it will be transformed into a vapor or gas. This vapor or gas then passes upwardly through the successive trays 12, 14, 16 and 18 intermixing with and being rectified by the layer of liquid on each tray, the rectified vapor or gas ultimately leaving the tower 10 as an overhead product and in admixture with vaporized reflux, through transfer line 32. During the fractionating process heavy residues or "bottoms" collect in the bottom of the tower and are withdrawn at a suitable rate by means of a conduit 44 controlled by valve 46. In the case of liquid-liquid extraction operations, the lighter liquid may be introduced through conduit 40 and flow upward as would gas or vapor.

Figure 2:
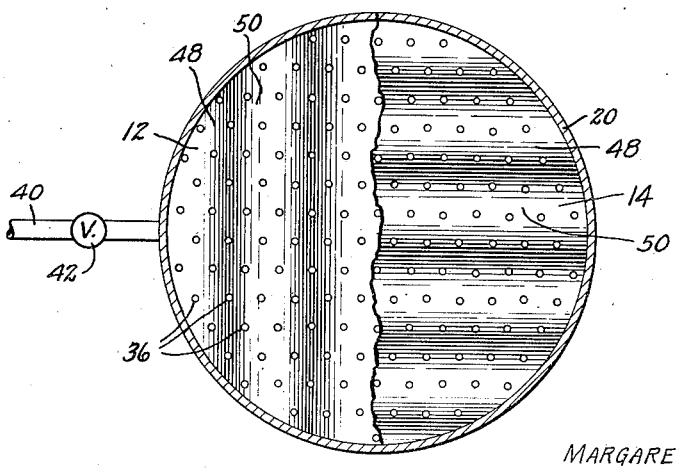
Fig. 2 is a view in section taken along the line 2—2 of Fig. 1.

Preferably, the successive trays 12, 14, 16 and 18, each having its pattern of tray unevenness in the form of regular straight, parallel waves of sinusoidal or substantially sinusoidal form, are disposed and arranged within the column shell 20 in the fashion depicted in Figs. 1 and 2 so that the axes of the waves are rotated or displaced in azimuth 90° with respect to one another on successive trays. While this arrangement is not essential, it has been found to be preferable in order to obtain best distribution onto each tray. Advantageously, however, the trays 12, 14, 16 and 18 may, if desired, be disposed and arranged within the column shell 20 with the axes of the waves parallel to one another on successive trays, as depicted in Fig. 3. In such case, it is preferred that the high and low areas 48 and 50, respectively, shall alternate on successive trays as appears in Fig. 3, in order that the distribution may be most favorable under these circumstances.

In the operation of the preferred tray structure and tray arrangement of the preferred embodiment of Figs. 1 and 2, or the modified tray structure and tray arrangement of the embodiment Figs. 3 and 4, a layer of relatively clear liquid is caused to be maintained on each of the trays 12, 14, 16 and 18. Each such layer of liquid reaches from the depressed areas or portions 50 of the tray to a level 52 which is, preferably, slightly above the level of the elevated areas 48 of the tray. Within this layer of liquid between the level 52 and the level corresponding to the highest points 48 of the tray, a uniform bubbling action exists across the entire active portion of the tray area, irrespective of high and low areas. This bubbling action results from the upward flow through the openings 36 and, in turn, through the overlying liquid layer, of lighter fluid passing up the tower countercurrent to the down-flowing heavier fluid. A frothy mass 54 of mixed phases will extend to a depth on the tray depending on tray design, flow rates of the fluids, and specific fluid properties. While the change from relatively clear liquid to overlying frothy liquid has been shown for illustrative purposes as being quite abrupt, it will be understood that in practice there is a more or less gradual change from one region to the other. Liquid falls from the tray at the lowest points only of the tray, to which it gravitates downwardly along the underside of the tray after passing through the various holes 36 at the various levels. The liquid flows from each tray at the lowest points in more or less continuous single thin sheets 38. However, liquid does not necessarily flow from all low points at any one time.

Since the depth of liquid over the elevated regions 48 of each tray is necessarily less than the depth of the liquid over the depressed areas 50, there are created zones of liquid of different static head ranging from a minimum over the elevated areas to a maximum over the depressed areas. However, the difference in static head consequent upon the difference in height between the highest and lowest areas of a given tray, is preferably small enough to permit upward flow of the lighter phase through the openings 36 even at the lower areas and to permit downward flow of the heavier phase through the openings even at the higher areas, although the lighter phase may flow preferentially at the higher areas and the heavier phase preferentially at the lower areas, the uniformity of flow depending upon tray dimensions and rates of flow. However, since the plates or trays as shown are formed with a smooth and gradual change from elevated to depressed areas, there will be no abrupt discontinuity in flow conditions but, on the contrary, certain of the perforations 36 will alternately admit vapor and discharge liquid at a frequency depending on the local rhythmic action of the liquid phase which in turn is a function of the structural characteristics of the apparatus and the operating conditions of the process.

This action results in a smooth but thorough intermixing of the two phases with the area or zone of frothing 54 extending uniformly over the entire active portion of the tray area. The avoidance of any erratic or discontinuous operation discourages the generation of high wave crests and enables the formation of a relatively clear, substantially non-aerated liquid below the highest points of the tray, which liquid is permitted to flow downwardly through the openings 36 to the next tray. The liquid escaping from the tray openings 36 gravitates downwardly along the under surface of the tray to collect at the lowest points of the depressed areas 50 thereof from which it falls in single thin sheets 38 to the succeeding tray. This type of liquid flow provides an opportunity for the disengagement of any small remaining quantities of the lighter phase. It can be seen that the action described, which produces good contacting on each tray, good separation of phases between trays, and good distribution onto each tray, contributes to high efficiencies. High flow rates with low vapor pressure losses are attainable as a result of the large number of openings possible, and the large proportion of active area.

Instead of the pattern of tray unevenness being one of straight, parallel, and regular waves of sinusoidal or substantially sinusoidal form as shown in Figs. 1–4 inclusive, it may take other forms, if desired, such, for example, as: the pattern shown in Fig. 5 wherein the tray 60 having openings 61 is characterized by V-shaped regular waves; the pattern shown in Fig. 6 wherein the tray 62 having openings 63 is characterized by high curved areas 64 and low flat areas 65 joined by curved and inclined areas 66; the pattern shown in Fig. 7 wherein the tray 67 having openings 68 is characterized by adjacent high and low flat areas 69 and 70, respectively, joined by straight and inclined areas 71; or, the pattern of Fig. 8 wherein the tray 72 having openings 73 is characterized by adjacent high flat areas 73 and low curved areas 74 joined by straight and inclined areas 75. If desired, the pattern of tray unevenness may be as shown in Fig. 9 wherein the tray 76 having openings 77 is characterized by a pattern of sinusoidal and concentric waves having crests 78 and troughs 79; or as shown in Fig. 10 wherein the tray 80 having openings 81 is characterized by a checkerboard pattern of alternating areas 82, 83, 84 and 85 of pie-shape having straight parallel waves 86, the direction of which is changed by 90° on successive areas; or, as shown in Fig. 11 wherein the tray 87 having openings 88 is characterized by shallow cups 89 pressed or otherwise effected uniformly in and over the plane surfaced tray area, and conforming to the requirements set forth above. In the case of the cup construction, high and low areas are preferably alternated on successive trays. In the case of concentric waves, it is not necessary to alternate high and low areas on successive trays.

As an example of dimensions and conditions that have been found to be advantageous in connection with this new and improved tray, the following set, corresponding to known successful operation is given: A test column with a cross section 28 7/16" x 23 5/8" was fitted with two trays, each formed a flat plate perforated with 1/8" round holes on 1/4" equilateral triangular pitch and pressed into waves (corrugations) having 1/2" depth (difference in level between highest and lowest points) and 2" wave length or pitch (distance between corresponding points on adjacent crests or troughs). The spacing of the trays was 18" between mid-planes (that is, planes corresponding to half the distance between high and low points of the trays).

Air at 71° F. and 30" of mercury absolute pressure was introduced below the bottom tray, and water at 71° F. was distributed above the top tray.

When the water rate was 304 gal./hr./sq. ft. of column area and the superficial air rate was 6.85 ft./sec., the pressure drop of vapor across the lower tray was 1.54" of water, and the height of froth extended to 4½" above the mid-plane. The water contained about 5 parts per 100,000 of "Alkerterge" C, which under static conditions reduces the normal surface tension by about half.

It is apparent that the foregoing dimensions may be varied over quite a wide range and facilitate the attainment of a wide variety of operating conditions. For instance, round hole size may be in the range of from about 1/32 in. to 1/2 in. diameter more or less. Hole spacings may be such as to give from about 15 to about 25 percent gross area of openings referred to the developed area of the corrugated tray as such. Openings after the formation of waves, or equivalent, may be such as to give from about 18 to about 36 percent gross area of openings referred to the projected area of the corrugated tray as such. Wave length should be no less than the spacing of holes referred to the developed area, that is, before corrugation, and no greater than one third of tray diameter. Wave depth (two times the amplitude) should be no greater than the wave length and no less than hole radius or one-half of the smallest hole dimension. The above parameters are set forth merely as guides in the practice of the invention and while they generally comprehend the more desirable dimensions of the elements, they are not intended as limitations.

With the favorable tray stability and efficient intermixing of the counterflowing fluids, the entire contacting process can be controlled to effect a wide range of results. For instance, tray diameter, hole size and spacing, and wave formation can be so chosen for any designated fluid rates that suitable depths of frothy liquid may be maintained on each tray. If desired, the plates or trays may be spaced quite closely together by selecting appropriate conditions.

The bubble tray in accordance with the invention therefore provides a highly effective means for attaining intimate and thorough mixing of counterflowing fluids under highly stable and uniform conditions. By reason of the inherent characteristics of structures in accordance with this invention a high degree of control can be exercised over the processes in which they are employed making them readily adaptable to a wide variety of applications.

Advantages of the perforated tray of this invention over flat perforated trays with separate downpipes for liquid are; mainly, cheaper construction, higher capacities, elimination of liquid gradient, and the possibility of lower pressure drop of vapor. Advantages over flat perforated trays without separate downpipes for liquid are; mainly, greater structural rigidity of the active areas, higher capacities, greater operating flexibility, greater design flexibility, lower pressure drop of vapor, a higher proportion of active area, and the existence of conditions generally favoring more efficient contacting of the fluid phases involved. These conditions are better distribution of fluids, greater uniformity of contacting, less surging, and less entrainment of the heavier phase by the lighter phase.

Advantages of the perforated tray of this invention over perforated trays without separate downpipes for liquid, but with relatively quiet pockets or troughs for accumulating and discharging relatively clear liquid are: mainly lower perforating cost, simpler construction, higher capacities, a higher proportion of active area, lower pressure drop of vapor, greater operating flexibility, and conditions generally favoring more efficient contacting of the fluid phases involved. These conditions are: greater uniformity of contacting, better mixing, less entrainment of the heavier phase by the lighter phase, and the characteristic of liquid discharging single sheets which reduces to a minimum the area occupied by liquid between trays.

What is claimed is:

1. In a column for the countercurrent contacting of liquid or liquids or fluidized solid or solids with gas or vapor, or of liquid or liquids with a lighter and immiscible liquid, a bubble tray partitioning said column, said tray comprising essentially a perforated sheet having a plurality of substantially uniformly spaced high and low perforated areas connected by intermediate perforated areas, and having the openings in said areas of substantially uniform size and arranged in a substantially uniform pattern of openings over the developed area of said sheet and in which pattern the spacing of the openings is substantially less than the spacing between said high and low areas so as to provide a uniform distribution of openings over said high, low and intermediate areas, said openings providing the sole passageway for the flow of the lighter and heavier counterflowing phases through the partition formed by said tray, the transition between said high and low areas being relatively smooth and gradual, the uniform spacing of said high and low areas being small in relation to the overall tray area, and the difference in height between the highest and lowest areas of the tray being small enough, with a layer of the heavier counterflowing phase overlying said openings, to permit upward flow of the lighter counterflowing phase through said openings even at the lower areas and, in turn, through said overlying layer of heavier counterflowing phase and to permit downward flow of the heavier phase from said layer through the openings even at the higher areas.

2. A bubble tray in accordance with claim 1 in which the difference in height between the highest and lowest areas of the tray is sufficient to cause the lighter phase to flow preferentially at the higher areas and the heavier phase to flow preferentially at the lower areas.

3. A bubble tray in accordance with claim 1 in which the pattern of tray unevenness formed by the uniformly spaced high and low areas is one of regular waves.

4. A bubble tray in accordance with claim 3 in which the waves of the pattern are arranged in straight parallel lines.

5. A bubble tray in accordance with claim 4 in which the waves of the pattern approximate sinusoidal form.

6. A bubble tray in accordance with claim 3 in which the waves of the pattern are characterized by a V-shape.

7. A bubble tray in accordance with claim 3 in which the waves of the pattern are characterized by high and low flat areas joined by straight and inclined areas.

8. A bubble tray in accordance with claim 3 in which the waves of the pattern are arranged in checkerboard fashion with alternating squares having straight, parallel waves, the direction of which changes by 90° on successive checker units.

9. A bubble tray in accordance with claim 1 in which the pattern of tray unevenness is one of shallow cups or depressions effected uniformly over the tray.

10. A bubble tray in accordance with claim 3 in which the pattern of tray unevenness is one in which the waves approximate sinusoidal form and are concentric.

11. A bubble tray in accordance with claim 5 in which the openings are round holes approximately one-eighth inch in diameter on approximately one-quarter inch equilateral triangular centers, in which the pitch or length of the waves is approximately two inches and in which the difference in height or level between the highest and lowest areas of the tray is approximately one-half inch.

12. A bubble tray in accordance with claim 3 in which the openings are round holes of a diameter in the range of from about one thirty-second of an inch to about one-half of an inch, in which the hole spacings are such as to give from about fifteen to about twenty-five percent gross area of openings referred to the developed area and from about eighteen to about thirty-six percent gross area of openings, referred to the projected area, in which the wave length is not less than the spacing of the holes, referred to the developed area and not greater than about one-third of the tray diameter, and in which the wave depth is not greater than the wave length and not less than the hole radius.

13. In a column for the countercurrent contacting of liquid or liquids or fluidized solid or solids with gas or vapor, or of liquid or liquids with a lighter and immiscible liquid, a plurality of bubble trays partitioning said column, said trays each having a pattern of tray unevenness characterized by substantially uniformly spaced high and low perforated areas connected by intermediate perforated areas, said areas forming straight, parallel waves, the axes of the waves being rotated with respect to one another on successive trays, and said trays each having the openings in its said areas of substantially uniform size and arranged in a substantially uniform pattern of openings over the developed area of the tray and in which pattern the spacing of the openings is substantially less than the wave length of said waves so as to provide a uniform distribution of openings from the crest to the trough of said waves, said openings providing the sole passageway for the flow of lighter and heavier counter flowing phases through the partition formed by the tray, the transition between the high and low areas of each said tray being relatively smooth and gradual, the uniform spacing of said high and low areas being small in relation to the overall tray dimension and the difference in height between the highest and lowest areas of the tray being small enough, with a layer of the heavier counterflowing phases overlying said openings, to permit upward flow of the lighter counterflowing phase through said openings even at the lower areas and, in turn, through said overlying layer of heavier counterflowing phase and to permit downward flow of the heavier phase from said layer through the openings even at the higher areas.

14. In a column for the countercurrent contacting of liquid or liquids or fluidized solid or solids with gas or vapor, or of liquid or liquids with a lighter and immiscible liquid, a plurality of bubble trays partitioning said column, said trays each having a pattern of tray unevenness characterized by substantially uniformly spaced high and low perforated areas connected by intermediate perforated areas, said areas forming straight, parallel waves, the high and low areas being alternated on successive trays, and said trays each having the openings in said areas of substantially uniform size and arranged in a substantially uniform pattern of openings over the developed area of the tray and in which pattern the spacing of the openings is substantially less than the wave length of said waves so as to provide a uniform distribution of openings from the crest to the trough of said waves, said openings providing the sole passageway for the flow of the lighter and heavier counterflowing phases through the partition formed by the tray, the transition between the high and low areas of each said tray being relatively smooth and gradual, the uniform spacing of said high and low areas being small in relation to the overall tray dimension and the difference in height between the highest and lowest areas of the tray being small enough, with a layer of the heavier counterflowing phase overlying said openings, to permit upward flow of the lighter counterflowing phase through said openings even at the lower areas and, in turn, through said overlying layer of heavier counterflowing phase, and to permit downward flow of the heavier phase from said layer through the openings even at the higher areas.

15. A bubble tray comprising essentially a perforated plate having a surface configuration providing a pattern of tray unevenness in the form of substantially sinusoidally formed substantially uniformly spaced perforated areas of depression and perforated areas of elevation connected by intermediate perforated areas, and having the perforations in said areas of substantially uniform size and arranged in a substantially uniform pattern of perforations referred to the developed area of said plate and in which pattern the spacing of the perforations is substantially less than the spacing between said areas of depression and elevation so as to provide a uniform distribution of perforations over said areas of depression and elevation and said intermediate areas, said perforations providing the sole passageway for the flow of counterflowing fluid phases through the tray, the area of each perforation being small compared to that of said areas of depression and elevation, the spacing of the perforations being such as to give about 15 percent to about 25 percent gross area of openings referred to the developed area of said plate, and the gross area of said perforations being in the range of from about 18 percent to about 36 percent, referred to the projected area of said plate.

16. A bubble tray in accordance with claim 15 in which the perforations are arranged in said pattern on a substantially equilateral triangular pitch.

References Cited in the file of this patent

UNITED STATES PATENTS

| | | |
|---|---|---|
| 24,543 | Dickinson | June 28, 1859 |
| 1,749,266 | Sontag | Mar. 4, 1930 |
| 2,005,316 | Hall | June 18, 1935 |
| 2,047,444 | Stedman | July 14, 1936 |
| 2,568,749 | Kittel | Sept. 25, 1951 |

FOREIGN PATENTS

| | | |
|---|---|---|
| 43,100 | Austria | July 25, 1910 |